US009442893B2

(12) United States Patent
Horio

(10) Patent No.: US 9,442,893 B2
(45) Date of Patent: Sep. 13, 2016

(54) PRODUCT-SUM OPERATION CIRCUIT AND PRODUCT-SUM OPERATION SYSTEM

(71) Applicant: FUJITSU LIMITED, Kawasaki-shi, Kanagawa (JP)

(72) Inventor: Kazuo Horio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 14/337,692

(22) Filed: Jul. 22, 2014

(65) Prior Publication Data

US 2015/0074163 A1    Mar. 12, 2015

(30) Foreign Application Priority Data

Sep. 11, 2013   (JP) .................................. 2013-188186

(51) Int. Cl.
*G06F 17/16* (2006.01)
*G06F 7/544* (2006.01)

(52) U.S. Cl.
CPC ............. *G06F 17/16* (2013.01); *G06F 7/5443* (2013.01)

(58) Field of Classification Search
CPC ............................. G06F 7/5443; G06F 17/16
See application file for complete search history.

(56) References Cited

U.S. PATENT DOCUMENTS

| | | | | |
|---|---|---|---|---|
| 2005/0240646 A1* | 10/2005 | Lin | ......................... | G06F 17/16 708/607 |
| 2009/0172053 A1* | 7/2009 | Nam | ........................ | G06F 17/16 708/209 |
| 2012/0078988 A1* | 3/2012 | Miller | ..................... | G06F 17/16 708/322 |
| 2014/0365548 A1* | 12/2014 | Mortensen | ............ | G06F 9/3001 708/523 |

FOREIGN PATENT DOCUMENTS

| | | |
|---|---|---|
| JP | 10-063647 A | 3/1998 |
| JP | 2009-245296 A | 10/2009 |

* cited by examiner

*Primary Examiner* — Chuong D Ngo
(74) *Attorney, Agent, or Firm* — Arent Fox LLP

(57) ABSTRACT

A product-sum operation circuit that performs a matrix product of a first-matrix and a second-matrix to output a third-matrix, includes; a plurality of multipliers; a plurality of first-adders each of which is configured to add two multiplication results of the plurality of multipliers; a plurality of second-adders each of which is configured to add two addition results of the plurality of the first-adders; an input selector configured to output an element of the first-matrix and an element of the second-matrix to input terminals of the plurality of multipliers according to the number of rows and the number of columns of the first-matrix and the second-matrix; and an output selector configured to select and output the addition results of each of the plurality of first-adders or each of the plurality of second-adders according to the number of rows and the number of columns of the first-matrix and the second-matrix, as the third-matrix.

5 Claims, 9 Drawing Sheets

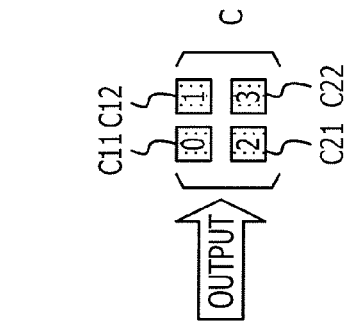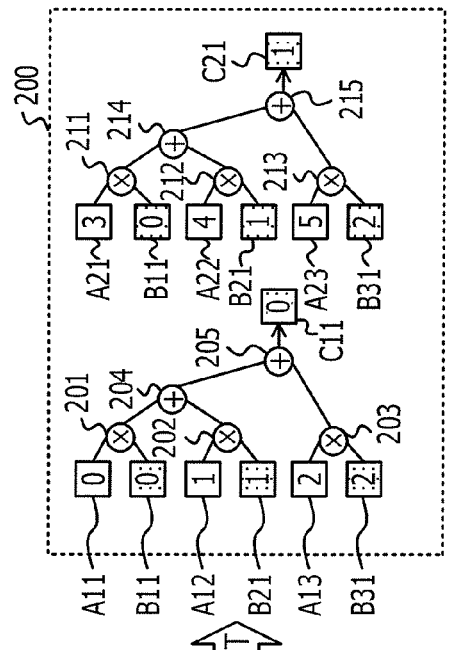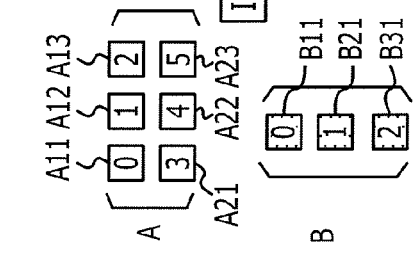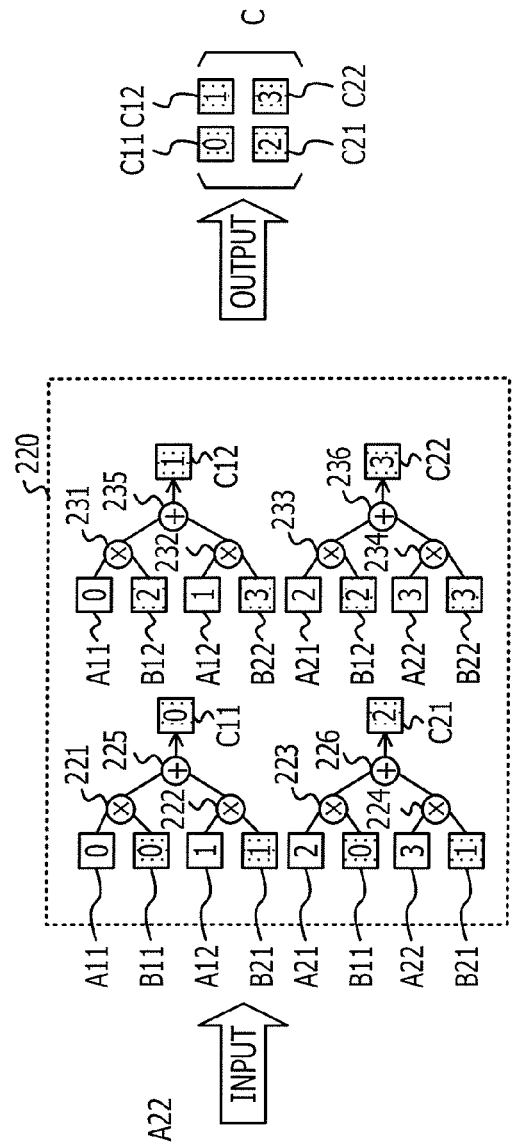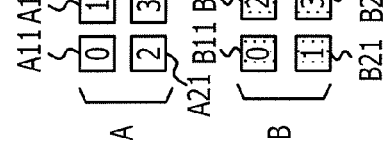
FIG. 2A
FIG. 2B

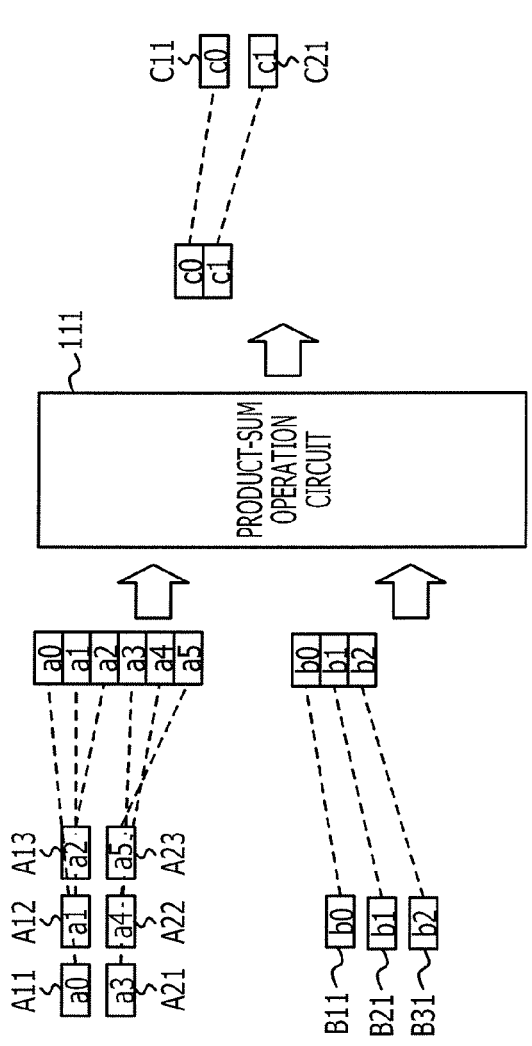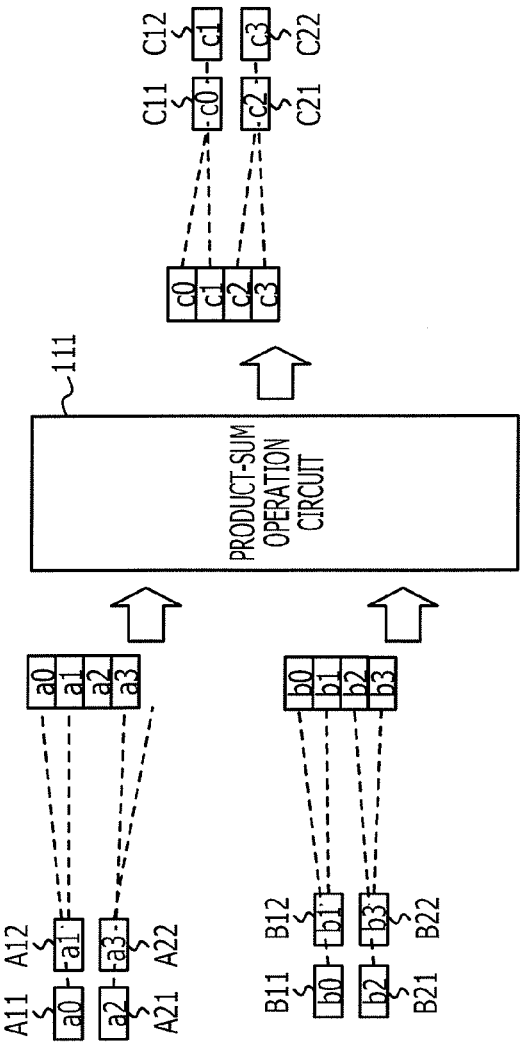

FIG. 7A

| | I0_0 | I0_1 | I0_2 | I0_3 | I0_4 | I0_5 | I0_6 | I0_7 | I1_0 | I1_1 | I1_2 | I1_3 | I1_4 | I1_5 | I1_6 | I1_7 |
|---|---|---|---|---|---|---|---|---|---|---|---|---|---|---|---|---|
| M=2,N=1,K=3 | a0 | a1 | a2 | "0" | a3 | a4 | a5 | "0" | b0 | b1 | b2 | "0" | b0 | b1 | b2 | "0" |
| M=2,N=2,K=2 | a0 | a1 | a0 | a1 | a2 | a3 | a2 | a3 | b0 | b1 | b2 | b3 | b0 | b1 | b2 | b3 |

FIG. 7B

| | c0 | c1 | c2 | c3 | c4 | c5 | c6 | c7 |
|---|---|---|---|---|---|---|---|---|
| M=2,N=1,K=3 | D2_0 | D2_1 | - | - | - | - | - | - |
| M=2,N=2,K=2 | D1_0 | D1_1 | D1_2 | D1_3 | - | - | - | - |

PRODUCT-SUM OPERATION CIRCUIT AND PRODUCT-SUM OPERATION SYSTEM

CROSS-REFERENCE TO RELATED APPLICATION

This application is based upon and claims the benefit of priority from the prior Japanese Patent Application No. 2013-188186 filed on Sep. 11, 2013, the entire contents of which are incorporated herein by reference.

FIELD

The embodiments discussed herein are related to a product-sum operation circuit and a product-sum operation system.

BACKGROUND

A product-sum operation circuit that performs a matrix product operation has been known (See, for example, Japanese Laid-Open Patent Publication No. 2009-245296). A predetermined number of multipliers execute in parallel the integration of each row vector constituted by a group of a predetermined number of elements in a row direction among elements of a first matrix and each column vector constituted by a group of a predetermined number of elements in a column direction among elements of a second matrix. An adder for multipliers acquires and adds multiplication results of the multipliers at the next stage of the multipliers, of which number is the same as that of the elements. An adder for adders acquires and adds the addition result of the adder for the multipliers at next stage of the adder for the multipliers. A latency counter measures a latency of an adder for the adder placed at the last stage. The variable counter counts each time when the latency counter measures latency of the adder for the adders at the last stage and outputs a signal indicating that an operation result of the matrix product may be acquired when counting is performed until a count value reaches a predetermined number of accumulation. The variable counter setting unit sets a count value of the variable counter.

Further, the matrix operation device has been known (See, for example, Japanese Laid-Open Patent Publication H10-63647). The matrix operation device divides and stores data of all elements of a matrix required to be operated in a plurality of divided storage memory of matrix data and simultaneously outputs the necessary data from the plurality of divided storage memory of matrix data using the reading unit according to the decoding results of a decoder. Also, the matrix operation device transfers data to the product-sum operation unit through the selector unit to perform the product-sum operation and outputs the operation result, and also records the operation result in the divided storage memory of matrix data through a recording unit.

Related techniques are disclosed in, for example, Japanese Laid-Open Patent Publication No. 2009-245296 and Japanese Laid-Open Patent Publication No. H10-63647.

It is necessary to calculate a large quantity of products of complex matrices in a signal processing for wireless communication. Since a lot of multipliers are needed for obtaining the product of the complex matrix, the circuit area and power consumption increase. Further, inconsistent number of rows and columns of a matrix for which a product is to be obtained causes an increase of the circuit area. For example, when intending to calculate a channel capacity for a case where the number of transceiver antennas is 4 (four), it is necessary to obtain the products of matrices having various different sizes, for example, a product of a matrix with 4 rows and 4 columns and another matrix with 4 rows and 4 columns, or a product of a matrix with 3 rows and 4 columns and a matrix with 4 rows and 3 columns.

In LTE (Long Term Evolution)-Advanced communication standard, the number of transceiver antennas may be as many as 8 (eight) at maximum and thus it is necessary to obtain more number of products of matrices which have different sizes than ever before, so that an amount of calculation itself increases.

The simplest solution to the calculation is to mount a calculation circuit of a product of matrixes having different sizes in hardware. However, in this case, an operation unit that is not being activated may exist, which results in an increase of a circuit area due to existence of an unnecessary operation unit.

The present disclosure intends to provide the product-sum operation circuit and the product-sum operation system that may perform a product operation of matrices having various sizes at a smaller circuit area.

SUMMARY

A product-sum operation circuit according to an aspect of the present disclosure performs a product operation of a first matrix and a second matrix to output a third matrix. The product-sum operation circuit includes: a plurality of multipliers; a plurality of first adders each of which adds two multiplication results of the plurality of multipliers; a plurality of second adders each of which adds two addition results of the plurality of the first adders; an input selector which outputs an element of the first matrix and an element of the second matrix to input terminals of the plurality of multipliers according to the number of rows and the number of columns of the first matrix and the second matrix; and an output selector selects and outputs the addition results of the plurality of first adders or the plurality of second adders according to the number of rows and columns of the first matrix and the second matrix, as the third matrix.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2A and FIG. 2B are views illustrating an exemplary configuration of a product-sum operation circuit;

FIG. 6A and FIG. 6B are views illustrating inputs and outputs of the product-sum operation circuit;

FIG. 7A is a view illustrating operations of an input selector and FIG. 7B is a view illustrating operations of an output selector;

DESCRIPTION OF EMBODIMENTS

Figure 1:
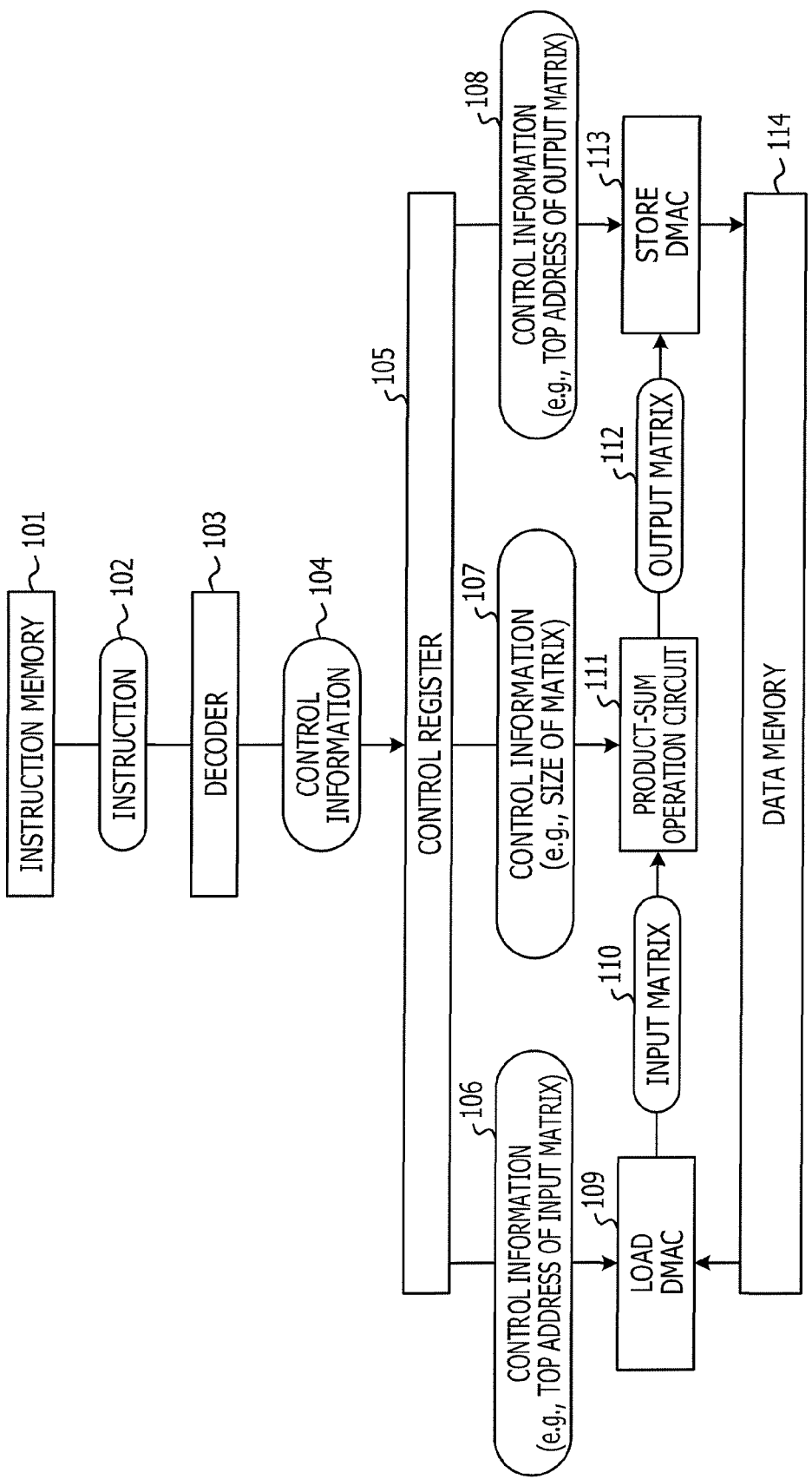
FIG. 1 is a view illustrating an exemplary configuration of a product-sum operation system according to the present embodiment.

FIG. 1 is a view illustrating an exemplary configuration of a product-sum operation system according to the present embodiment. The product-sum operation system performs a product operation of a first matrix and a second matrix so as to obtain a third matrix. The first matrix and the second matrix are input matrices and the third matrix is an output matrix. The first matrix and the second matrix are stored in a data memory 114. The third matrix is written into the data memory 114 after the operation.

An instruction memory 101 stores an instruction of matrix product operation 102. Mnemonic of the instruction of matrix product operation 102 is, for example, "mxmul A, B, C, M, N, K", where "mxmul" is an op code. "A" is the top address of the data memory 114 in which the first matrix is stored. "B" is the top address of the data memory 114 in which the second matrix is stored. "C" is the top address of the data memory 114 into which the third matrix is written. "M" is the number of rows of the first matrix. "N" is the number of columns of the second matrix. "K" is the number of columns of the first matrix and the number of rows of the second matrix.

The decoder 103 receives the instruction of matrix product operation 102 as an input from the instruction memory 101, decodes the instruction of matrix product operation 102 and writes control information 104 in a control register 105. The control information 104 includes control information 106, 107 and 108. The control information 106 includes the top address A of the data memory 114 in which the first matrix is stored and the top address B of the data memory 114 in which the second matrix is stored. The control information 107 includes the number of rows M of the first matrix, the number of columns N of the second matrix, and the number of columns K the first matrix (=the number of rows of the second matrix). The control information 108 includes the top address C of the data memory 114 in which the third matrix is written. A direct memory access controller (DMAC) 109 is a DMAC for loading and reads the first matrix and the second matrix from the data memory 114 according to the control information 106 inputted from the control register 105 to output the first and second matrices to the product-sum operation circuit 111. The input matrix 110 is the first matrix and the second matrix. The product-sum operation circuit 111 performs a product operation of the first matrix and the second matrix according to the control information 107 inputted from the control register 105 to output the third matrix to the DMAC 113 as the output matrix 112. The DMAC 113 is a DMAC for storing and writes the third matrix in the data memory 114 according to the control information 108 inputted from the control register 105.

FIG. 2A is a view illustrating an exemplary configuration of a product-sum operation circuit 200. The first matrix A and the second matrix B are an input matrix and the third matrix C is an output matrix. The product-sum operation circuit 200 performs the product operation of the first matrix A and the second matrix B to output the third matrix C. The first matrix A is a matrix with two rows and three columns and contains six elements A11, A12, A13, A21, A22 and A23. The second matrix B is a matrix with three rows and one column and contains three elements B11, B21 and B31. The third matrix C is a matrix with two rows and one column and contains two elements C11 and C21.

A subscript of an element indicates a row number and a column number. For example, the element A12 indicates an element placed at the first row and the second column of the matrix. Further, for example, the number "0" of the element A11, the number "0" of the element B11 and the number "0" of the element C11 do not indicate a value but a sequence number of an element in each matrix.

The product-sum operation circuit 200 includes a plurality of multipliers 201, 201, 203 and 211, 212, 213 and a plurality of adders 204, 205, 214, 215. The multiplier 201 multiplies element A11 and element B11. The multiplier 202 multiplies element A12 and element B21. The multiplier 203 multiplies element A13 and element B31. The adder 204 adds a multiplication result of the multiplier 201 and a multiplication result of the multiplier 202. The adder 205 adds an addition result of the adder 204 and a multiplication result of the multiplier 203 to output element C11.

The multiplier 211 multiplies element A21 and element B11. The multiplier 212 multiplies element A22 and element B21. The multiplier 213 multiplies element A23 and element B31. The adder 214 adds a multiplication result of the multiplier 211 and a multiplication result of the multiplier 212. The adder 215 adds an addition result of the adder 214 and a multiplication result of the multiplier 213 to output element C21.

The third matrix C is constituted by element C11 output from the adder 205 and element C12 output from the adder 215.

FIG. 2B is a view illustrating an exemplary configuration of another product-sum operation circuit 220. The first matrix A and the second matrix B are an input matrix and the third matrix C is an output matrix. The product-sum operation circuit 220 performs an operation of a product of the first matrix A and the second matrix B to output the third matrix C. The first matrix A is a matrix with two rows and two columns and contains four elements A11, A12, A21 and A22. The second matrix B is a matrix with two rows and two columns and contains four elements B11, B12, B21 and B22. The third matrix C is a matrix with two rows and two columns and contains four elements C11, C12, C21 and C22.

The product-sum operation circuit 220 includes a plurality of multipliers 221, 221, 223,224 and a plurality of adders 225, 226, 235, 236. The multiplier 221 multiplies element A11 and element B11. The multiplier 222 multiplies element A12 and element B21. The multiplier 223 multiplies element A21 and element B11. The multiplier 224 multiplies element A22 and element B21. The adder 225 adds a multiplication result of the multiplier 221 and a multiplication result of the multiplier 222 to output element C11. The adder 226 adds a multiplication result of the multiplier 223 and a multiplication result of the multiplier 224 to output element C21.

The multiplier 231 multiplies element A11 and element B1. The multiplier 232 multiplies element A12 and element B22. The multiplier 223 multiplies element A21 and element B12. The multiplier 234 multiplies element A22 and element B22. The adder 235 adds a multiplication result of the multiplier 231 and a multiplication result of the multiplier 232 to output element C12. The adder 236 adds a multiplication result of the multiplier 233 and a multiplication result of the multiplier 234 to output element C22.

The third matrix C is constituted by the element C11 output from the adder 225, the element C21 output from the adder 226, the element C12 output from the adder 235, and the element C22 output from the adder 236.

As described above, the product-sum operation circuit 200 of FIG. 2A performs an operation of a product of a matrix A with two rows and three columns and a matrix B with three rows and one column. The product-sum operation circuit 220 of FIG. 2B performs an operation of a product of a matrix A with two rows and two columns and a matrix B with two and two columns. The configuration of the product-sum operation circuit 220 is different from that of the product-sum operation circuit 200 due to the difference in the number of rows and the number of columns of the first matrix A and the second matrix B.

Different product-sum operation circuits 200 and 220 are required to perform an operation of a product of the matrix A and the matrix B that have a different matrix size. When intending to perform an operation of a product of the matrix A and the matrix B that have various sizes, the number of types of the product-sum operation circuit such as the product-sum operation circuits 200 and 220 becomes large and thus, a circuit area becomes large.

According to the present embodiment, the product-sum operation circuit and the product-sum operation system that may perform an operation of a product of matrices having various sizes using a smaller circuit area is provided.

Figure 3:
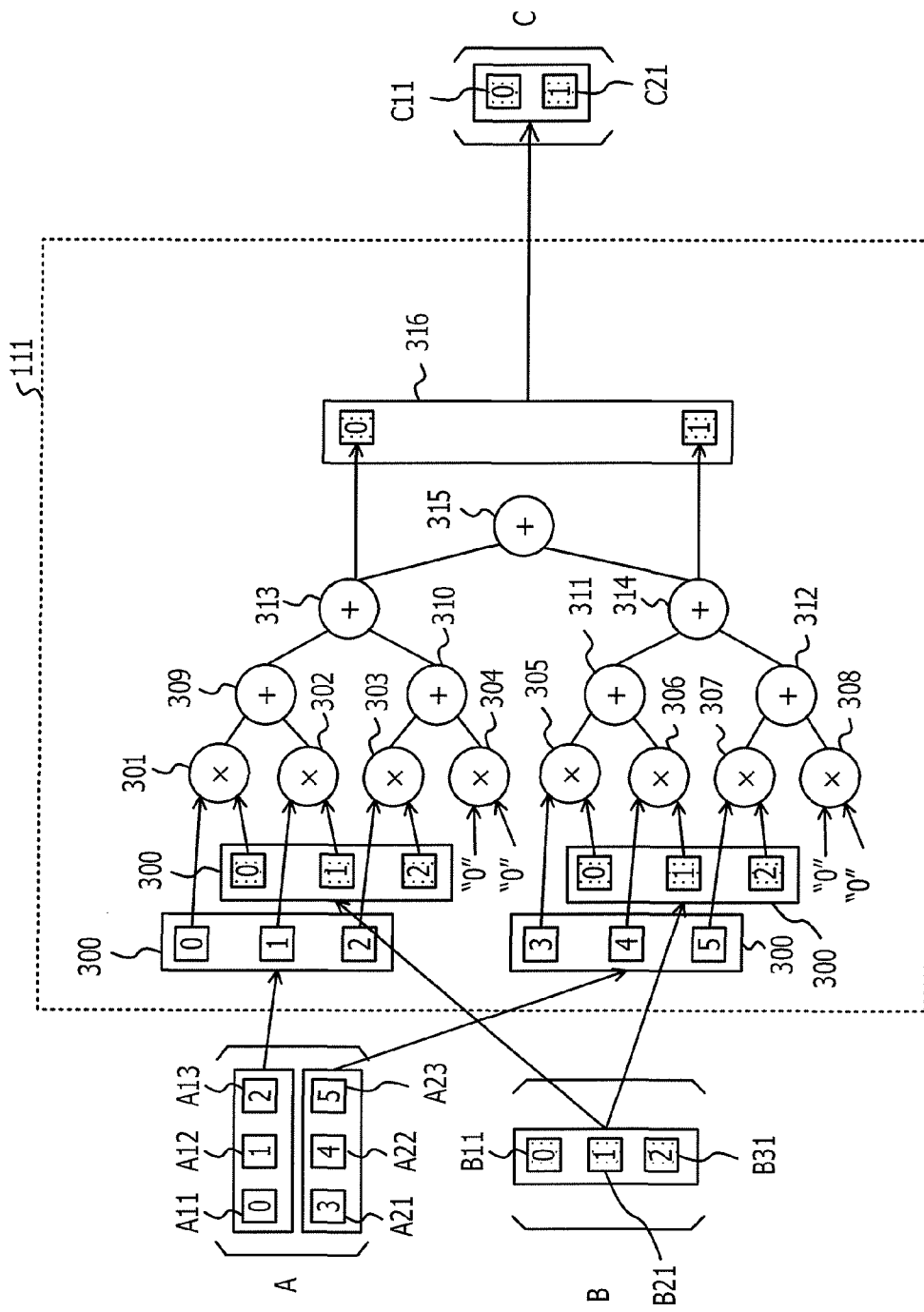
FIG. 3 is a view illustrating an exemplary configuration of the product-sum operation circuit of FIG. 1.

FIG. 3 is a view illustrating an exemplary configuration of the product-sum operation circuit 111 of FIG. 1. The product-sum operation circuit 111 performs a matrix product of the first matrix A and the second matrix B to output the third matrix C. The first matrix A is a matrix with two rows and three columns and contains six elements A11, A12, A13, A21, A22 and A23. The second matrix B is a matrix with three rows and one column and contains three elements B11, B21 and B31. The third matrix C is a matrix with two rows and one column and contains two elements C11 and C12. In this case, the number of rows M of the first matrix A is 2 (two), the number of columns K (=the number of rows of the second matrix B) of the first matrix A is 3 (three) and the number of columns N of the second matrix B is 1 (one).

The product-sum operation circuit 111 includes an input selector 300, a plurality of multipliers 301, 302, 303, 304, 305, 306, 307 and 308, a plurality of adders 309, 310, 311, 312, 313, 314 and 315, and an output selector 316. The input selector 300 selects and outputs the elements A11 and B11 to the multiplier 301. Further, the input selector 300 selects and outputs elements A12 and B21 to the multiplier 302. Further, the input selector 300 selects and outputs elements A13 and B31 to the multiplier 303. Further, the input selector 300 selects and outputs elements A21 and B11 to the multiplier 305. Further, the input selector 300 selects and outputs elements A22 and B21 to the multiplier 306. Further, the input selector 300 selects and outputs elements A23 and B31 to the multiplier 307.

The multiplier 301 multiplies element A11 and element B11. The multiplier 302 multiplies element A12 and element B21. The multiplier 303 multiplies element A13 and element B31. The multiplier 304 multiplies the numbers "0" and "0" to output "0". The multiplier 305 multiplies element A21 and element B11. The multiplier 306 multiplies element A22 and element B21. The multiplier 307 multiplies element A23 and element B31. The multiplier 308 multiplies the numbers "0" and "0" to output "0".

The adder 309 adds a multiplication result of the multiplier 301 and a multiplication result of the multiplier 302. The adder 310 adds a multiplication result of the multiplier 303 and a multiplication result of the multiplier 304. The adder 311 adds a multiplication result of the multiplier 305 and a multiplication result of the multiplier 306. The adder 312 adds a multiplication result of the multiplier 307 and a multiplication result of the multiplier 308.

The adder 313 adds an addition result of the adder 309 and an addition result of the adder 310. The adder 314 adds an addition result of the adder 311 and an addition result of the adder 312. The adder 315 adds an addition result of the adder 313 and an addition result of the adder 314.

The output selector 316 selects and outputs the addition result of the adder 313 as the element C11 and selects and outputs the addition result of the adder 314 as the element C21. The third matrix C is constituted by the element C11 and element C21 output from the output selector 316.

Figure 4:
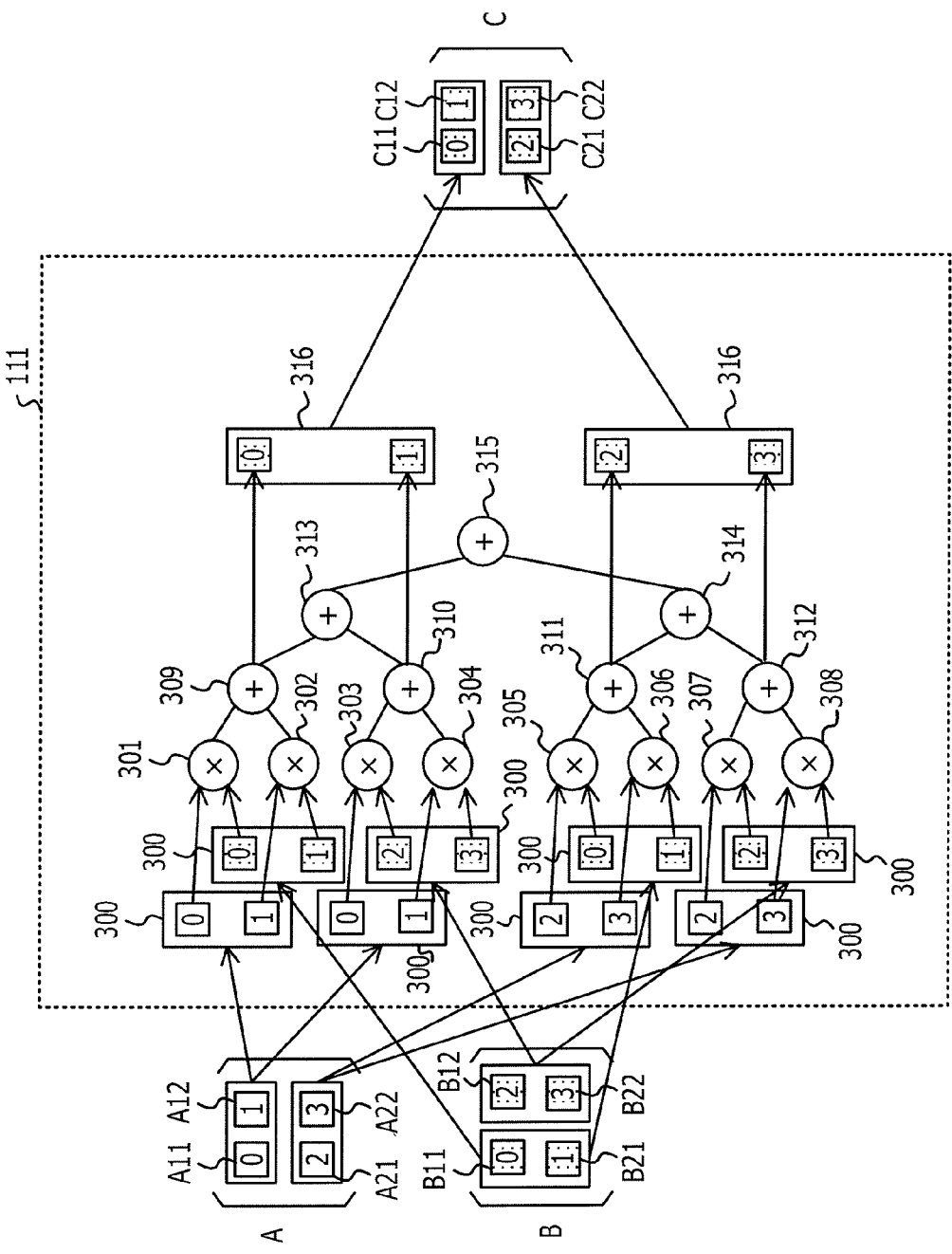
FIG. 4 is a view illustrating another example of processing performed by the product-sum operation circuit of FIG. 1.

FIG. 4 is a view illustrating another example of processing performed by the product-sum operation circuit 111 of FIG. 1. The configuration of the product-sum operation circuit 111 of FIG. 4 is the same as that of the product-sum operation circuit 111 of FIG. 3, but the sizes of the first matrix A and the second matrix B are different from those of FIG. 4, respectively. The first matrix A is a matrix with two rows and two columns and contains four elements A11, A12, A21 and A22. The second matrix B is a matrix with two rows and two columns and contains four elements B11, B12, B21 and B22. The third matrix C is a matrix with two rows and two columns and contains four elements C11, C12, C21 and C22. In this case, the number of rows M of the first matrix A is 2 (two), the number of columns K of the first matrix A (=the number of rows of the second matrix B) is 2 (two) and the number of columns N of the second matrix B is 2 (two).

The input selector 300 selects and outputs elements A11 and B11 to the multiplier 301. Further, the input selector 300 selects and outputs elements A12 and B21 to the multiplier 302. Further, the input selector 300 selects and outputs elements A11 and B12 to the multiplier 303. Further, the input selector 300 selects and outputs elements A12 and B22 to the multiplier 304. Further, the input selector 300 selects and outputs elements A21 and B11 to the multiplier 305. Further, the input selector 300 selects and outputs elements A22 and B21 to the multiplier 306. Further, the input selector 300 selects and outputs elements A21 and B12 to the multiplier 307. Further, the input selector 300 selects and outputs elements A22 and B22 to the multiplier 308.

The multiplier 301 multiplies element A11 and the element B11. The multiplier 302 multiplies element A12 and element B21. The multiplier 303 multiplies element A11 and element B12. The multiplier 304 multiplies element A12 and element B22. The multiplier 305 multiplies element A21 and element B11. The multiplier 306 multiplies element A22 and element B21. The multiplier 307 multiplies element A21 and element B12. The multiplier 308 multiplies element A2 and element B22.

The adder 309 adds a multiplication result of the multiplier 301 and a multiplication result of the multiplier 302. The adder 310 adds a multiplication result of the multiplier 303 and a multiplication result of the multiplier 304. The adder 311 adds a multiplication result of the multiplier 305 and a multiplication result of the multiplier 306. The adder 312 adds a multiplication result of the multiplier 307 and a multiplication result of the multiplier 308.

The adder 313 adds an addition result of the adder 309 and an addition result of the adder 310. The adder 314 adds an addition result of the adder 311 and an addition result of the adder 312. The adder 315 adds an addition result of the adder 313 and an addition result of the adder 314.

The output selector 316 selects and outputs the addition result of the adder 309 as the element C11, selects and outputs the addition result of the adder 310 as the element C12, selects and outputs the addition result of the adder 311 as the element C21, and selects and outputs the addition result of the adder 312 as the element C22. The third matrix C is constituted by the elements C11, C12, C21 and C22 output from the output selector 316.

As described above, when the number of columns of the second matrix B is N, the input selector 300 outputs N sets of elements of each row of the first matrix A to input terminals of the plurality of multipliers 301 to 308. In a case of FIG. 3, the input selector 300 outputs N (=1) sets of elements of each row of the first matrix A to input terminals of the plurality of multipliers 301 to 308. Further, in a case of FIG. 4, the input selector 300 outputs N (=2) sets of elements of each row of the first matrix A to input terminals of the plurality of multipliers 301 to 308.

Further, when the number of rows of the first matrix A is M, the input selector 300 outputs M sets of elements of each column of the second matrix B to input terminals of the plurality of multipliers 301 to 308. In a case of FIG. 3, the input selector 300 outputs M (=2) sets of elements of each column of the second matrix B to input terminals of the plurality of multipliers 301 to 308. Further, in a case of FIG. 4, the input selector 300 outputs M (=2) sets of elements of each column of the second matrix B to input terminals of the plurality of multipliers 301 to 308.

Figure 5:
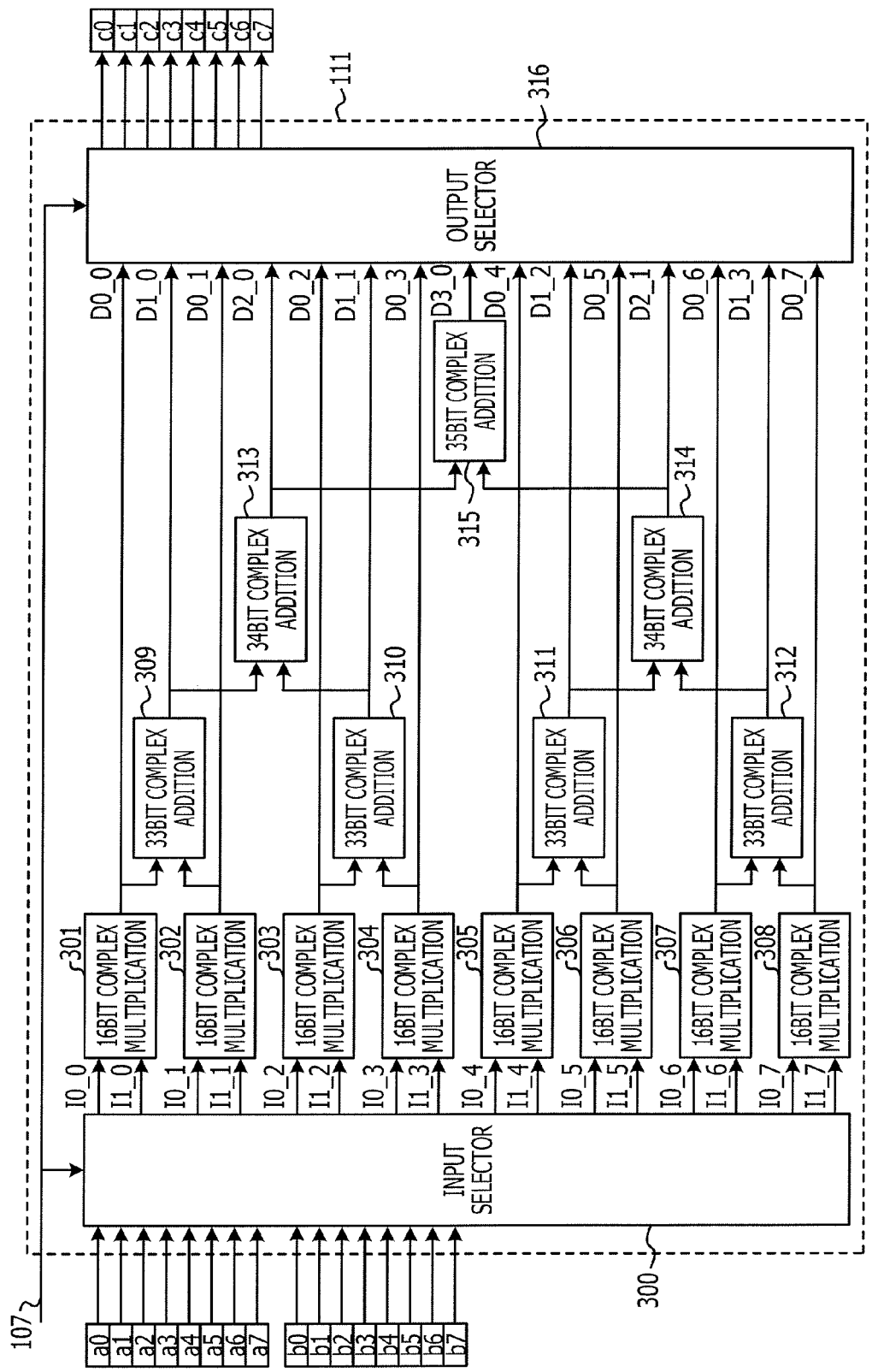
FIG. 5 is a view illustrating an example of more specific configuration of the product-sum operation circuit of FIG. 3 and FIG. 4.

FIG. 5 is a view illustrating an example of more specific configuration of the product-sum operation circuit 111 of FIG. 3 and FIG. 4. The elements a0, a1, a2, a3, a4, a5, a6 and a7 are elements of the first matrix A and are sequentially input from the data memory 114 of FIG. 1 in an order of address. As illustrated in FIG. 3, when the first matrix A has a size of two rows by three columns, the elements a0, a1, a2, a3, a4 and a5 correspond to the elements A11, A12, A13, A21, A22, A23, respectively, as illustrated in FIG. 6A. Further, as illustrated in FIG. 4, when the first matrix A has a size of two rows by two columns, the elements a0, a1, a2 and a3 correspond to the elements A11, A12, A21 and A22, respectively, as illustrated in FIG. 6B.

The elements b0, b1, b2, b3, b4, b5, b6 and b7 are elements of the second matrix B and are sequentially input from the data memory 114 of FIG. 1 in an order of address. As illustrated in FIG. 3, when the second matrix B has a size of three rows by one column, the elements b0, b1 and b2 correspond to the elements B11, B21 and B31, respectively, as illustrated in FIG. 6A. Further, as illustrated in FIG. 4, when the second matrix B has a size of two rows by two columns, the elements b0, b1, b2 and b3 correspond to the elements B11, B12, B21 and B22, respectively, as illustrated in FIG. 6B.

The input selector 300 receives elements a0, a1, a2, a3, a4, a5, a6 and a7 of the first matrix A and elements b0, b1, b2, b3, b4, b5, b6 and b7 of the second matrix B and outputs input values I0_0, I0_1, I0_2, I0_3, I0_4, I0_5, I0_6 and I0_7 and I1_0, I1_1, I1_2, I1_3, I1_4, I1_5, I1_6 and I1_7 to the multipliers 301, 302, 303, 304, 305, 306, 307 and 308, respectively, according to the control information 107. The control information 107 includes, as described above, the number of rows M of the first matrix A, the number of columns N of the second matrix B and the number of columns K of the first matrix A (=the number of rows of the second matrix B). Specifically, as illustrated in FIG. 7A, the input selector 300 outputs the input values I0_0~I0_7 and I1_0~I1_7 according to the numbers M, N and K.

For example, when M=2, N=1, K=3 as in FIG. 3, the input selector 300 selects and outputs the element a0 as the input value M0, the element a1 as the input value I0_1, the element a2 as the input value I0_2, the value "0" as the input value I0_3, the element a3 as the input value I0_4, the element a4 as the input value I0_5, the element a5 as the input value I0_6, the value "0" as the input value I0_7, and the element b0 as the input value I1_0, the element b1 as the input value I1_1, the element b2 as the input value I1_2, the value "0" as the input value I1_3, the element b0 as the input value I1_4, the element b1 as the input value I1_5, the element b2 as the input value I1_6 and the value "0" as the input value I1_7.

Further, when M=2, N=2, K=2 as in FIG. 4, the input selector 300 selects and outputs the element a0 as the input value I0_0, the element a1 as the input value I0_1, the element a0 as the input value I0_2, the element a1 as the input value I0_3, the element a2 as the input value I0_4, the element a3 as the input value I0_5, the element a2 as the input value I0_6, the element a3 as the input value I0_7, and the element b0 as the input value I1_0, the element b1 as the input value I1_1, the element b2 as the input value I1_2, the element b3 as the input value I1_3, the element b0 as the input value I1_4, the element b1 as the input value I1_5, the element b2 as the input value I1_6 and the element b3 as the input value I1_7.

The multipliers 301, 302, 303, 304, 305, 306, 307 and 308 are 16-bit complex multipliers. The complex multiplier 301 performs a complex multiplication of the input values I0_0 and I1_0 to output an output value D0_0. The complex multiplier 302 performs a complex multiplication of the input values I0_1 and I1_1 to output an output value D0_1. The complex multiplier 303 performs a complex multiplication of the input values I0_2 and I1_2 to output an output value D0_2. The complex multiplier 304 performs a complex multiplication of the input values I0_3 and I1_3 to output an output value D0_3. The complex multiplier 305 performs a complex multiplication of the input values I0_4 and I1_4 to output an output value D0_4. The complex multiplier 306 performs a complex multiplication of the input values I0_5 and I1_5 to output an output value DOS. The complex multiplier 307 performs a complex multiplication of the input values I0_6 and I1_6 to output an output value D0_6. The complex multiplier 308 performs a complex multiplication of the input values I0_7 and I1_7 to output an output value D0_7.

Figure 8A:
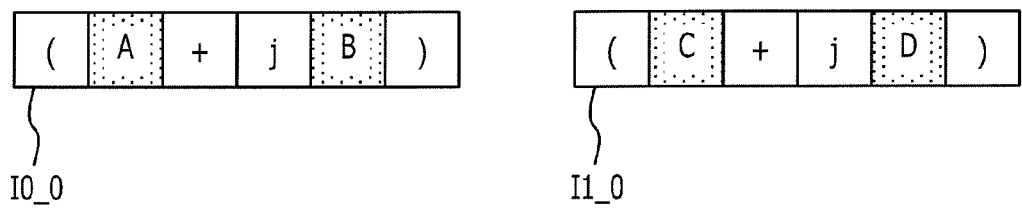
FIG. 8A is a view illustrating examples of input values and FIG. 8B is a view illustrating an exemplary configuration of a complex multiplier.
Figure 8B:
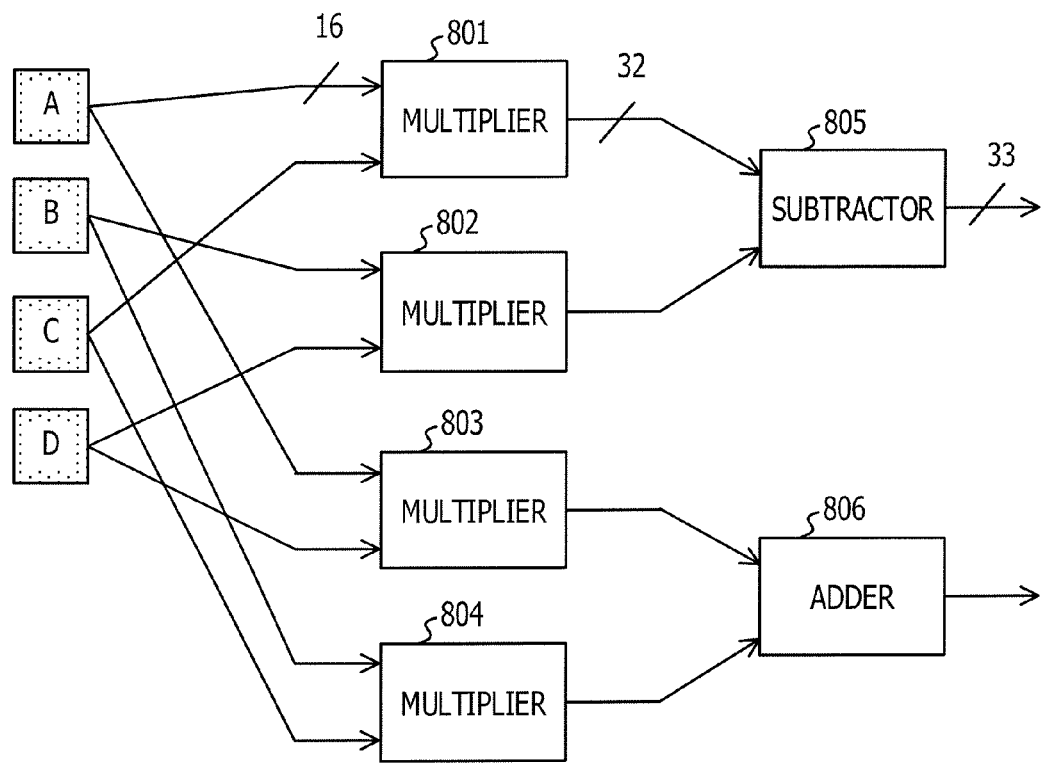

FIG. 8A is a view illustrating examples of the input values I0_0 and I1_0 and FIG. 8B is a view illustrating an exemplary configuration of the complex multiplier 301. Further, the complex multipliers 302 to 308 have the same configuration as that of the complex multiplier 301. The input value I0_0 is a complex number which is A+jB and the input value I1_0 is a complex number which is C+jD, where A and C are 16-bit real part, respectively, and B and D are 16-bit imaginary part, respectively. The complex multiplier 301 includes multipliers 801, 802, 803 and 804, a subtractor 805 and an adder 806. The multiplier 801 multiplies the 16-bit real part A and the 16-bit real part C to output A×C. The multiplier 802 multiplies the 16-bit imaginary part B and the 16-bit imaginary part D to output B×D. The multiplier 803 multiplies the 16-bit real part A and the 16-bit imaginary part D to output A×D. The multiplier 804 multiplies the 16-bit imaginary part B and the 16-bit real part C to output B×C. The subtractor 805 subtracts the multiplication result of the multiplier 802 from the multiplication result of the multiplier 801 to output A×C−B×D as the real part (33 bits) of the output value D0_0. The adder 806 adds the multiplication result of the multiplier 803 and the multiplication result of the multiplier 804 to output A×D+B×C as the imaginary part (33 bits) of the output value D0_0. The output value D0_0 is a complex number which is (A×C−B×D)+j(A×D+B×C).

In FIG. 5, the adders 309, 310, 311 and 312 are 33-bit complex adders and the adders 313 and 314 are 34-bit complex adders and the adder 315 is a 35-bit complex adder. The adders 313 and 314 are 34-bit complex adders. The adder 315 is a 35-bit complex adder. The complex adder 309 performs a complex addition of the output values D0_0 and D0_1 to output the output value D1_0. The complex adder 310 performs a complex addition of the output values D0_2 and D0_3 to output the output value D1_1. The complex adder 311 performs a complex addition of the output values D0_4 and DOS to output the output value D1_2. The complex adder 312 performs a complex addition of the output values D0_6 and D0_7 to output the output value D1_3. The complex adder 313 performs a complex addition of the output values D1_0 and D1_1 to output the output value D2_0. The complex adder 314 performs a complex addition of the output values D1_2 and D1_3 to output the output value D2_1. The complex adder 315 performs a complex addition of the output values D2_0 and D2_1 to output the output value D3_0.

Figure 9A:
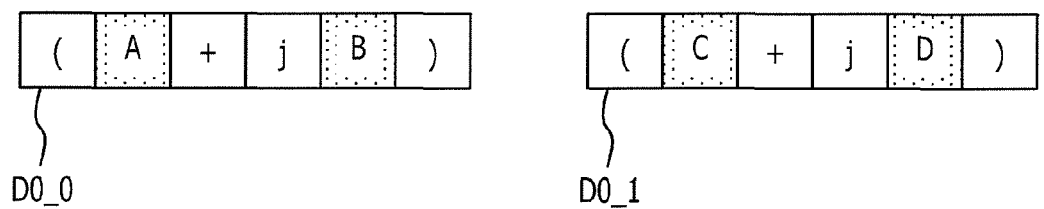
FIG. 9A is a view illustrating examples of input values and FIG. 9B is a view illustrating an exemplary configuration of a complex adder.
Figure 9B:
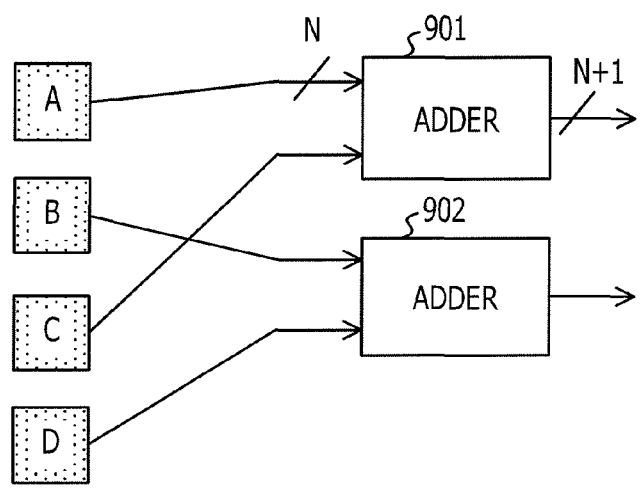

FIG. 9A is a view illustrating examples of the input values I0_0 and I1_0 and FIG. 9B is a view illustrating an exemplary configuration of the complex adder 309. Further, the complex adders 310 to 315 also have the same configuration as that of the complex multiplier 309. The output value D0_0 is a complex number which is A+jB and the output value D0_1 is a complex number which is C+jD, where A and C are 33-bit real part, respectively, and B and D are 33-bit imaginary part, respectively. The complex adder 309 includes adders 901 and 902. The adder 901 adds the real part A and the real part C to output A+C as the real part (34 bits) of the output value D1_0. The adder 902 adds the imaginary part B and the imaginary part D to output B+D as the imaginary part (34 bits) of the output value D1_0. The output value D1_0 is a complex number which is (A+C)+j(B+D).

In FIG. 5, the output selector 316 receives the output values D0_0 to D0_7, D1_0 to D1_3, D2_0 and D2_1 and D3_0 as inputs and outputs elements c0, c1, c2, c3, c4, c5, c6 and c7 according to the control information 107. Specifically, as illustrated in FIG. 7B, the output selector 316 outputs the elements c0 to c7 according to the numbers M, N and K of the control information 107.

For example, as illustrated in FIG. 3, when M=2, N=1, K=3, the output selector 316 selects and outputs the output value D2_0 as the element c0 and the output value D2_1 as the element c1. Further, as illustrated in FIG. 4, when M=2, N=2, K=2, the output selector 316 selects and outputs the output value D1_0 as the element c0, the output value D1_1 as the element c1, the output value D1_2 as the element c2 and the output value D1_3 as the element c3.

The elements c0 to c7 are elements of the third matrix C and sequentially written in the data memory 114 of FIG. 1. As illustrated in FIG. 3, when M=2, N=1, K=3, as illustrated in FIG. 6A, the element c0 and the element c1 correspond to the element C11 and the element C21, respectively. The elements C11 and C21 constitute the third matrix C.

Further, when M=2, N=2, K=2 as illustrated in FIG. 4, the element c0 corresponds to the element C11, the element c1 corresponds to the element C12, the element c2 corresponds to the element C21 and the element c3 corresponds to the element C22, as illustrated in FIG. 6A. The elements C11, C12, C21 and C22 constitute the third matrix C.

Further, the first matrix A, the second matrix B and the third matrix C are not limited to the complex number but may be a unitary number. In such a case, the multipliers 301 to 308 are simple multipliers and the adders 309 to 315 are simple adders.

As described above, each of the plurality of first adders 309, 310, 311 and 312 adds two multiplication results among the results of the plurality of multipliers 301 to 308. Each of the plurality of second adders 313 and 314 adds two addition results among the addition results of the plurality of first adders 309 to 312. The input selector 300 outputs the element of the first matrix A and the element of the second matrix B to input terminals of the plurality of multipliers 301 to 308 according to the number of rows M of the first matrix A, the number of columns N of the second matrix B and the number of columns K (=the number of rows of the second matrix B) of the first matrix A. The output selector 306 selects and outputs the addition results of the plurality of first adders 309 to 312 or the plurality of second adders 313 to 314 as the third matrix C according to the number of rows M of the first matrix A, the number of columns N of the second matrix B and the number of columns K (=the number of rows of the second matrix B) of the first matrix A.

According to the present embodiment, even when the sizes of the first matrix A and the second matrix B vary, the multipliers 301 to 308 and the adders 309 to 315 may be shared as in FIG. 3 and FIG. 4. The input selector 300 and the output selector 316 are provided so as to share the multipliers 301 to 308 and the adders 309 to 315 and thus, the product operation of matrices having various sizes may be performed using a smaller circuit area.

Further, the embodiments described above are simply specified examples for embodying the present disclosure and is not intended to be construed as limiting a technical scope of the present disclosure to the embodiments. That is, the present disclosure may be embodied in various shapes without being departed from the technical ideas and principal features thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A product-sum operation circuit that performs a matrix product of a first matrix and a second matrix to output a third matrix, the product-sum operation circuit comprising
a plurality of multipliers;
a plurality of first adders each of which is configured to add two multiplication results of the plurality of multipliers;
a plurality of second adders each of which is configured to add two addition results of the plurality of the first adders;
an input selector configured to output an element of the first matrix and an element of the second matrix to input terminals of the plurality of multipliers according to the number of rows and the number of columns of the first matrix and the second matrix; and an output selector configured to select and output the addition results of each of the plurality of first adders or each of the plurality of second adders according to the number of rows and the number of columns of the first matrix and the second matrix, as the third matrix.

2. The product-sum operation circuit according to claim 1, wherein the input selector is configured to output N sets of elements of each row of the first matrix to input terminals of the plurality of multipliers and output M sets of elements of each column of the second matrix to input terminals of the plurality of multipliers, when the number of rows of the first matrix is M and the number of columns of the second matrix is N.

3. The product-sum operation circuit according to claim 1, wherein the output selector is configured to select and output addition results of the plurality of the second adders as a third matrix when the number of rows of the first matrix is 2 (two), and the number of columns of the first matrix and the number of rows of the second matrix are 3 (three) and the number of columns of the second matrix is 1 (one).

4. The product-sum operation circuit according to claim 1, wherein the output selector is configured to select and output addition results of the plurality of the first adders and output the addition results as a third matrix when the number of rows of the first matrix is 2 (two), and the number of columns of the first matrix and the number of rows of the second matrix are 2 (two) and the number of columns of the second matrix is 2 (two).

5. A product-sum operation system comprising:

the product-sum operation circuit according to claim 1;

a memory configured to store a first matrix and a second matrix;

a decoder configured to decode an instruction of matrix product operation, which includes the number of rows and columns of the first matrix and the second matrix and an address information of the memory in which the first matrix and the second matrix are stored, to output information of the number of rows and columns of the first matrix and the number of rows and columns of the second matrix to the input selector and the output selector; and a controller configured to read the first matrix and the second matrix from the memory according to the address information of the memory in which the first matrix and the second matrix are stored to output the first matrix and the second matrix to the input selector.

\* \* \* \* \*